(12) United States Patent
Lee

(10) Patent No.: US 8,341,013 B2
(45) Date of Patent: Dec. 25, 2012

(54) SYSTEM AND METHOD FOR ANALYZING AGENT INTERACTIONS

(75) Inventor: Howard M. Lee, Seattle, WA (US)

(73) Assignee: Intellisist, Inc., Bellevue, WA (US)

( * ) Notice: Subject to any disclaimer, the term of this patent is extended or adjusted under 35 U.S.C. 154(b) by 0 days.

(21) Appl. No.: 12/861,733

(22) Filed: Aug. 23, 2010

(65) Prior Publication Data

US 2010/0318410 A1    Dec. 16, 2010

Related U.S. Application Data

(63) Continuation of application No. 10/691,777, filed on Oct. 22, 2003, now Pat. No. 7,783,513.

(51) Int. Cl.
*G06Q 10/00* (2012.01)

(52) U.S. Cl. ........................ 705/7.42; 705/7.41; 705/7.39

(58) Field of Classification Search .................. 705/1.1, 705/7.11, 7.13, 7.14, 7.15, 7.16, 7.17, 7.18, 705/7.38, 7.39, 7.41, 7.42, 29, 30, 32, 26.1, 705/304

See application file for complete search history.

(56) References Cited

U.S. PATENT DOCUMENTS

| | | | | |
|---|---|---|---|---|
| 5,535,256 | A * | 7/1996 | Maloney et al. | 379/309 |
| 7,539,637 | B2 * | 5/2009 | Gatto | 705/36 R |
| 7,546,263 | B2 * | 6/2009 | Columbus et al. | 705/36 R |
| 2002/0184131 | A1 * | 12/2002 | Gatto | 705/36 |
| 2003/0144900 | A1 * | 7/2003 | Whitmer | 705/11 |
| 2004/0249650 | A1 * | 12/2004 | Freedman et al. | 705/1 |
| 2009/0327013 | A1 * | 12/2009 | McGovern et al. | 705/8 |
| 2010/0061529 | A1 * | 3/2010 | Cloran | 379/88.04 |

OTHER PUBLICATIONS

Cheung: Multifaceted conceptions of self-other ratings disagreement; Personnel Psychology v52n1; 1999; Abstract , pp. 2.*

* cited by examiner

*Primary Examiner* — Igor Borissov
(74) *Attorney, Agent, or Firm* — Patrick J. S. Inouye; Krista A. Wittman

(57) ABSTRACT

A system and method for analyzing agent interactions is provided. An interaction between an agent and a business is provided to analysts. Performance scores for the interaction are received from each of the analysts and compared. A deviation between the performance score is determined. The deviation is compared to a threshold. Further interactions are provided to at least one of the analysts when the deviation falls below the threshold. A further performance score for the interaction is received from the analyst and provided to the agent associated with the interaction.

20 Claims, 12 Drawing Sheets

SCORING PARAMETERS

262 Moving forward all the UK RMA's will be shipped from the fulfillment center in France......Moving forward all the .....

Customer Service Competencies — 264
Call Opening
- Used Proper Greeting.           Score:_____ 266
- Asked for Transaction ID.        Score:_____ 268
- Verified the Customer's Information.  Score:_____

Comments:_____ 270

Customer Service Skills (Accent and Voice) — 272
- Used good grammar, avoids slang or jargon.   Score:_____
- Rate of Speech mirrored that of customer.    Score:_____
- Hold courtesies were followed.               Score:_____
- Sounded confident, friendly, and polite.     Score:_____
- Set customer's expectations, used empathy if necessary escalated to a supervisor if necessary  Score:_____

Comments:_____

Call Closing — 280
- Offered additional products.     Score:_____
- Used proper closing script.      Score:_____

Comments:_____

Knowledge, Accuracy and Resolution — 282
- Demonstrate knowledge of the product process.  Score:_____
- Credit card authorization process followed.    Score:_____
- Offered alternate products; add on sales.      Score:_____
- Accurate and concise information was given to the customer.  Score:_____

Fig. 2C.

Call Management — 284
- Controlled call pace efficiently and length of call was appropriate to request.     Score:____
- Controlled call tone and length.     Score:____

Comments:_____

Sales — 286
- Identified sales opportunities.     Score:____
- Suggested alternate compatible products in exchange for return.     Score:____

Comments:_____

Comments Summary: — 288

Even better tips: — 290

| | CLIENT CALIBRATION | INTERNAL CALIBRATION | ATS | QUALITY AUDIT |
|---|---|---|---|---|
| ANALYST TRAINING (2 Weeks) | -- | -- | -- | -- |
| WEEK 1 | 1 Hour Daily | 1 Hour Daily | 1 Transaction/ Agent/ Day | 20% Transaction Monitoring |
| WEEK 2 | 3 Hours Weekly | 3 Hours Weekly | 2 Transaction/ Agent/ Week | 10% Transaction Monitoring |
| WEEK 3 | 2 Hours Weekly | 2 Hours Weekly | 1 Transaction/ Agent/ Week | 5% Transaction Monitoring |
| Ongoing | 2 Hours Weekly | 2 Hours Weekly | 1 Transaction/ Agent/ Week | 5% Transaction Monitoring |

Fig. 7.

| ACTIVITY PER AGENT | EXISTING AGENT PERFORMANCE | ENHANCED AGENT PERFORMANCE | % CHANGE ± |
|---|---|---|---|
| CALLS PER DAY | 62 | 62 | 0 |
| UP-SELL RATE | 8.0% | 8.8% | 10% |
| Avg UP-SELL $ | $25 | $28 | 10% |
| # of UP-SELLS | 4.96 | 5.46 | 10% |
| UP-SELL REVENUE | $124.00 | $150.04 | 21% |

REVENUE IMPROVEMENT = $26.04

MARGIN IMPROVEMENT (50%) = $13.02

AVERAGE ANALYST COST PER DAY = $1.50

ROI (PER DAY) (($13.02-$1.50)/$1.50)X100 = 768%

SYSTEM AND METHOD FOR ANALYZING AGENT INTERACTIONS

CROSS-REFERENCE TO RELATED APPLICATIONS

This application is a continuation of U.S. patent application, Ser. No. 10/691,777, filed Oct. 22, 2003, now, U.S. Pat. No. 7,783,513, issued Aug. 24, 2010, the priority date of which is claimed and the disclosure of which is incorporated by reference.

FIELD

The invention relates generally to measuring and improving business performance, and more specifically to a system and method for analyzing agent interactions.

BACKGROUND

Businesses interact with a plethora of customers on a daily basis across the world, in order to conduct commerce in the modern age. A given business experiences its own universe of customer interactions or transactions ("interactions" and "transactions" are used synonymously herein), which are necessary to maintaining a healthy and thriving state of business-customer relationships; such a state of business-customer relationships is necessary and vital to ensure the success of the business.

In order to interface with the customers, businesses have adopted the contact center model to provide personal service to the customers via teams of agents that engage in interactions with customers. Customers commonly use the telephone and email as a means of contacting a business, such a center staffed with agents to field calls from customers is commonly called a call center.

Call centers can vary in size from small units containing several agents to large units containing teams of agents numbering into the hundreds or even thousands. Often the call centers are large and require significant resources to staff, manage, and train the agents that comprise the call center. Call centers are managed by one or more managers whose jobs include both solving the complex customer problem, which presents questions beyond the authority of the agent to resolve, to supervising the agent's interaction with the customers so that the quality of service provided to the customers can be monitored and hopefully improved.

Accessing the quality of service provided to the customers by the call center agents has grown increasingly more difficult as call centers have increased in size. An agent handles many calls and/or emails a day; however, only a small fraction of the calls and/or emails fielded by an agent are ever monitored by a call center supervisor. Typically, call center agent performance is measured only once a week, at an agent level. This low frequency rate of monitoring does not provide an adequate measure of the agent's performance and the quality of service provided to the customer. U.S. Pat. No. 5,535,256 to Maloney et al. provides a tool to the call center supervisor that is aimed at automating the monitoring process within the constraints of a call center supervisor's ability to address the variety of tasks that the supervisor is assigned to do. However, the call center supervisor cannot sample the agent's calls frequently enough and provide the necessary feedback to the agent that is required to increase the quality of service provided to the customers. Neither can the call center supervisor increase the sales rate of the agents or the overall return on investment with respect to the call center.

What is needed are affordable processes and systems for business contact centers that are scalable to any size business which can also improve the performance of the contact center agents, their business processes, and their customer interactions.

SUMMARY

One embodiment provides a system and method for analyzing agent interactions. An interaction between an agent and a business is provided to analysts. Performance scores for the interaction are received from each of the analysts and compared. A deviation between the performance score is determined. The deviation is compared to a threshold. Further interactions are provided to at least one of the analysts when the deviation falls below the threshold. A further performance score for the interaction is received from the analyst and provided to the agent associated with the interaction.

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

The invention may best be understood by referring to the following description and accompanying drawings that are used to illustrate embodiments of the invention. The invention is illustrated by way of example in the embodiments and is not limited in the figures of the accompanying drawings, in which like references indicate similar elements.

FIG. 2B displays one embodiment of a score sheet.

FIG. 2C contains a continuation of the score sheet from FIG. 2B.

FIG. 3C illustrates an integration of calibration types, according to one embodiment of the invention.

FIG. 7 illustrates an example of increased profitability according to one embodiment of the invention.

DETAILED DESCRIPTION

In the following detailed description of embodiments of the invention, reference is made to the accompanying drawings in which like references indicate similar elements, and in which is shown by way of illustration, specific embodiments in which the invention may be practiced. These embodiments are described in sufficient detail to enable those of ordinary skill in the art to practice the invention. In other instances, well-known circuits, structures, and techniques have not been shown in detail in order not to obscure the understanding of this description. The following detailed description is, therefore, not to be taken in a limiting sense, and the scope of the invention is defined only by the appended claims.

Apparatuses and methods are described to allow businesses to increase profitability by monitoring a business's contact center processes at high frequency with special feedback provided to the business's contact center. High frequency monitoring is achieved by employing geographic wage attenuation coupled with language fluency between the agent-customer contact and the analyst.

Figure 1:
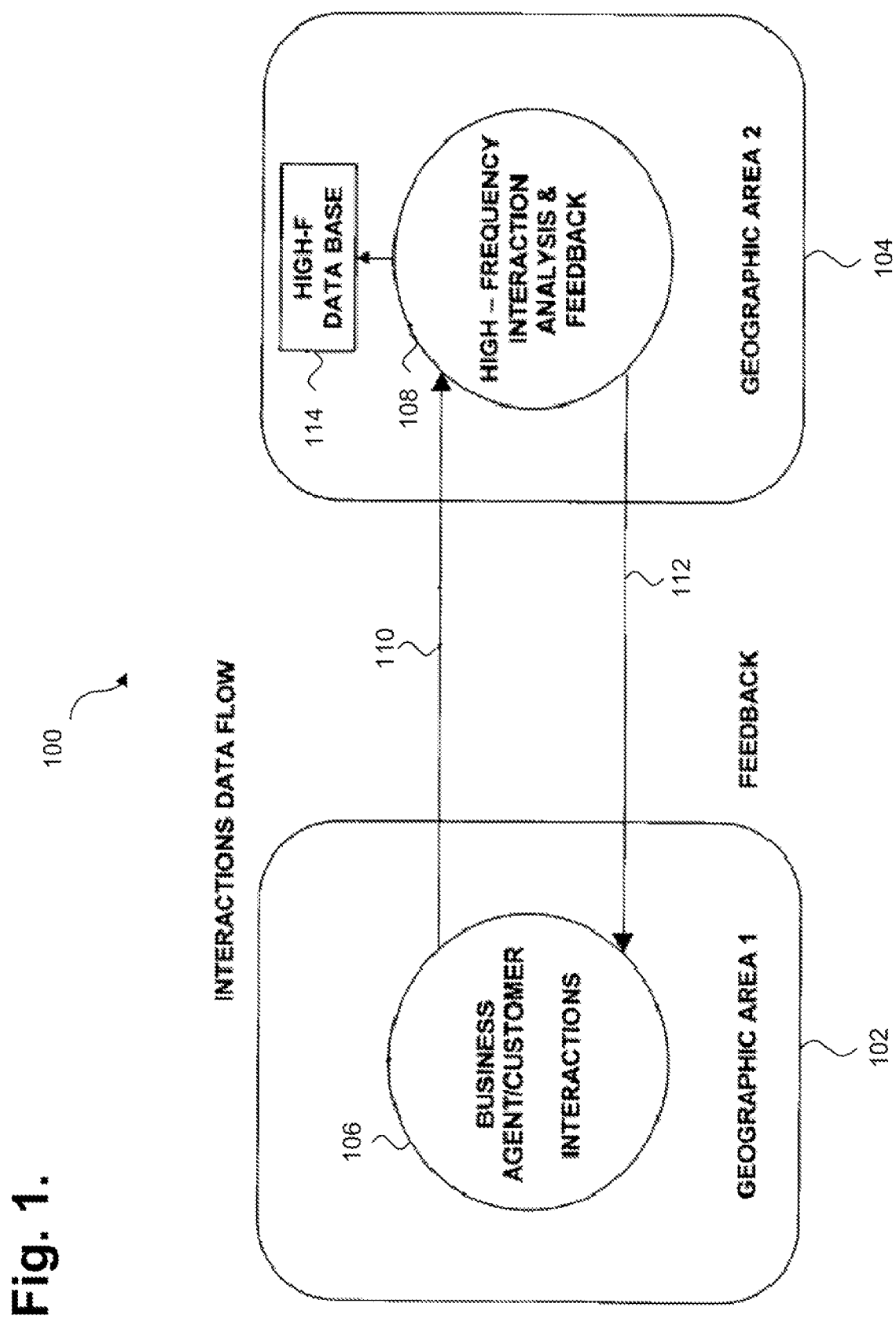
FIG. 1 illustrates a system architecture for business customer-contact analysis and improvement, employing wage attenuation, according to one embodiment of the invention.

FIG. 1 illustrates a system architecture for business customer-contact analysis and improvement, employing wage attenuation, according to one embodiment of the invention. With reference to FIG. 1, geographic wage attenuation is shown generally at 100. A first geographic area 1 is indicated at 102, wherein wages are high relative to a second geographic area 2 indicated generally at 104. Geographic area 102 and geographic area 104 are connected by a communication network that allows the transmission of information between the two geographic areas. Both geographic areas share at least one language in common and a differential in wages between the first and second geographic areas. For example, in one embodiment, geographic area 102 corresponds to the United States (US), geographic area 104 corresponds to India and the language shared in common is English. For a similar job, wages are higher in the US than wages are for the similar job in India; thereby establishing geographic wage attenuation between the two distinct geographic areas.

As used in this description, sharing a language in common does not imply that the language is shared across the whole population of the geographical area. It is sufficient that a number of people, however small, can be found within the geographical area where the analysis of the customer contact is performed, which shares the language in common with a number of people in the second geographical area. No constraint is placed on the number of people in either geographical area.

In one example, wages in the US are $20 US per hour and wages in India can be $4 US per hour for the same type of job. Wage attenuation will be defined as follows: wage attenuation equals the wages in geographic area 2 divided by the wages in geographic area 1. In the previous example the wage attenuation (0.2) is arrived at by dividing $4 by $20: 0.2=(4/20). Geographic area 1 or the first geographic area is the area where the business's customers are located and possibly the business's agents are located; however, all of the business's customers and/or agents need not be located in geographic area 1. Geographic area 2 or the second geographic area is the area where the analysis of the customer interaction or transaction ("interaction" and "transaction" are used synonymously herein) occurs.

In another embodiment, geographic area 102 can correspond to Canada, England or Australia. Some examples of geographic area 104 can include, but are not limited to, countries such as Botswana, Kenya, Liberia, Nigeria, South Africa, Swaziland, Tanzania, the Philippines, and Fiji, where the language in common is English. In another embodiment, geographic area 102 could correspond to France. Some examples of geographic area 104 can include, but are not limited to countries such as Algeria, Rwanda, Senegal, and Haiti, where the language in common is French. In another embodiment, geographic area 102 could correspond to the United States. Some examples of geographic area 104 can include, but are not limited to countries such as, Argentina, Dominican Republic, Ecuador, El Salvador, Equatorial Guinea, Republic of the Congo, Mexico, Nicaragua, Panama, and Uruguay, where the language in common is Spanish. No limitation is placed on the particular geographic areas comprising the geographic wage attenuator or the language shared in common between the two geographic areas. In one or more embodiments, of the invention, a geographic area is a general area and need not be confined to the boundaries of specific countries as named herein. The geographic area can be a general region and can include a part of a country or a part of more than one country.

Located within geographic area 102 are one or more businesses having teams of agents interacting with customers of the business, indicated generally at 106. Many types of agent-customer interactions can be analyzed with the apparatuses and methods taught herein. Such examples include, but are not limited to; inbound sales calls (to make and change reservations and sell tickets for travel on airlines, trains, boats, etc.) e-mails, trouble tickets, etc. Other interactions include, technical support calls subsequent to the purchase of a product or service, including warranty support issues, etc. Calls to rent products or services, such as automobiles, clothing, etc. The present invention is not limited by the type of agent-customer interaction engaged in by a business. The interactions can consist of a telephone call, email, data or any combination thereof.

The customers need not be confined to geographic area 102 but can be located in a variety of geographic areas other than 102 and 104. The agent/customer interaction data flow 110 proceeds from geographic area 102 to geographic area 104 by means of a communication network. The agent/customer interaction data flow is analyzed at high frequency at 108 in geographic area 104. Analysts located in geographic area 104 analyze an agent's customer interactions at a rate of at least one interaction per agent per day to create a high frequency analysis data base 114. Special uses of the high frequency analysis data base will be described in more detail below with reference to the figures that follow.

Feedback 112 flows from geographic area 104 to geographic area 102 and is communicated to the business's agents. Feedback 112 comprises the results of scoring the agent's interaction with a customer and is used to improve the agent's performance; thereby, increasing the business's profitability. Feedback 112 will be described more fully below with reference to the figures that follow.

The frequency at which an agent's interactions are analyzed can be controlled by either the business within 106 or by the analysts within 108. Typically, the agent's interactions with customers will be analyzed at approximately a rate of one interaction per agent per day, indicated by X or a statistically relevant sample size based on the requirements of a business. In some embodiments, the analysis rate can be greater and will be indicated by a number preceding the X. For example, analyzing 4 interactions per agent per day would be indicated by 4X.

Figure 2A:
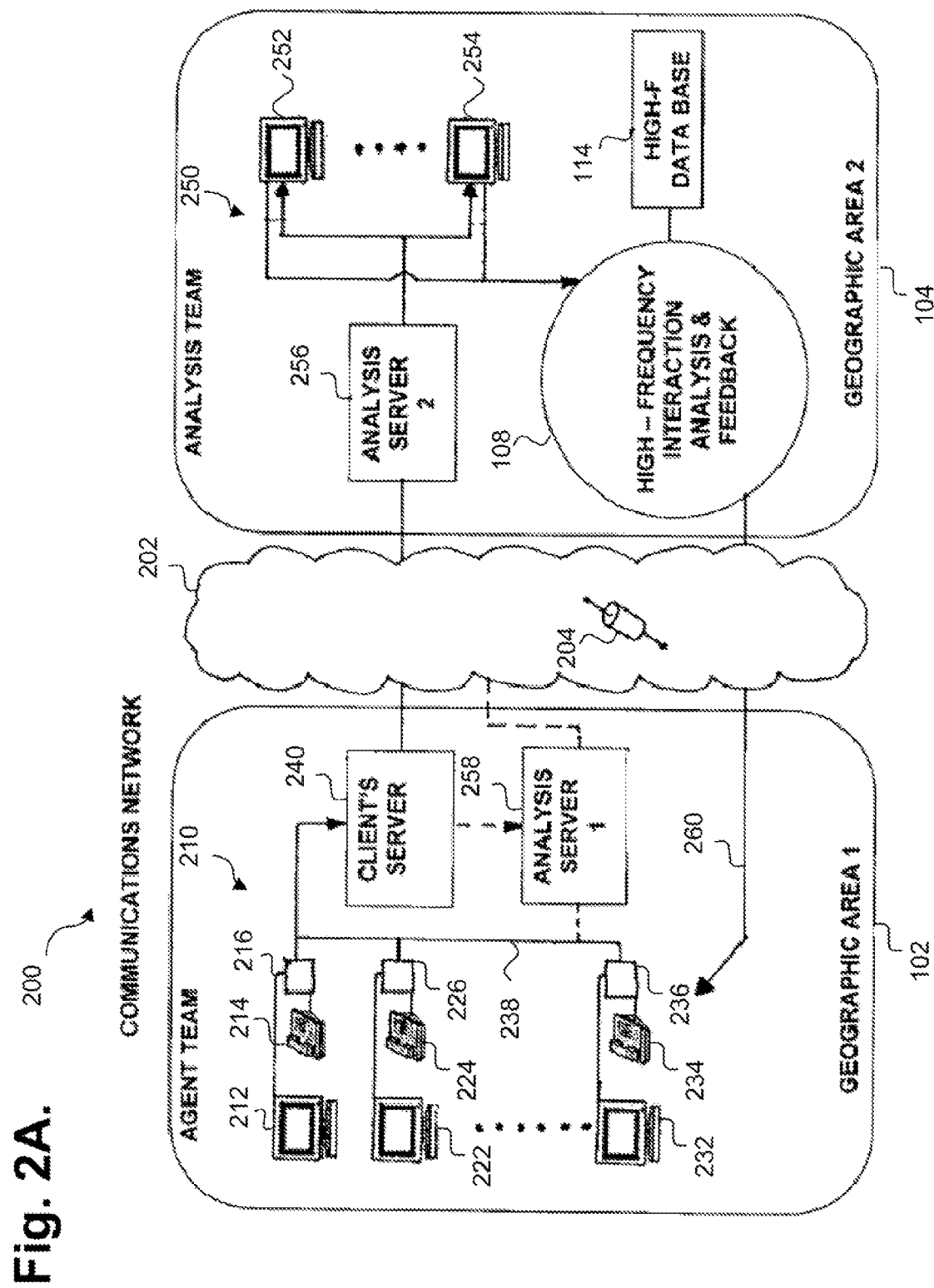
FIG. 2A illustrates one embodiment of high frequency contact center interaction monitoring.

FIG. 2A illustrates one embodiment of high frequency contact center interaction monitoring generally shown at 200. With reference to FIG. 2A, geographic area 102 and geographic area 104 are connected by communication network 202. Communications network 202 can be the Internet or a special purpose network configured to facilitate communications between the geographic areas in order to practice the invention. In one embodiment, communication network 202 can be a combination of general networks such as a business's intranet, the Internet, and special purpose networks configured to facilitate the practice of the invention. Communication network 202 can also include one or more satellites indicated by 204.

Within geographic area 102, one or more businesses engage in activity that requires interactions between agents and customers of the business. The interactions can take the form of telephone calls or emails. For simplicity within this description, but without loss of generality to multiple businesses, the discussion within the remainder of this detailed description of embodiments of the invention will be limited to describing a single business. It will be recognized that the teachings herein are scalable to businesses of any size and to a plurality of businesses without limit on the number of businesses.

A business's customer contact center is indicated by agent team 210. Agent team 210 can contain a general number of agents as indicated in FIG. 2A within geographic area 102. The agent team need not all be located within the same geographic area. For simplicity, only two geographic areas have been presented herein, 102 and 104. Similarly, not all of the business's customers need to be located within geographic area 102. The customers can be located in any geographic area and need not be limited to the two geographic areas shown, 102 and 104. In one or more embodiments, other communications networks (not shown) provide communications between customers in other geographic areas and the agent team 210 as well as providing communications between agent teams located in different geographic areas or an agent team distributed between different geographic areas.

Workstations for three agents are shown in FIG. 2A; however, a general number of workstations and agents is anticipated. A first agent's workstation consists of computer 212 and telephone 214. Calls and corresponding customer account information, for example, are combined at 216 and stored on client's server 240. Similarly, a second agent's computer, indicated at 222 and telephone 224 are combined at 226 and routed to client's server 240. Client's intranet 238 can provide a data network within the business's customer contact center operation. A general maximum number of workstations is indicated by computer 232, and telephone 234, which are combined at 236 and coupled with client's server 240 through intranet 238. Without limitation to the teachings presented herein, intranet 238 can be a wired network, for example an Ethernet line, a wireless network, for example a network according to the 802.11(a) or 802.11(b) standard, or any other suitable communications network.

In one embodiment, all customer interactions, including voice and pertinent data are stored on the client's server 240 and/or on an analysis server 258. The analysis server one (1) at 258 can provide a backup function to the client's server 240 or replace the client's server 240 according to a particular hardware configuration employed with a particular business. In other embodiments, the agent/customer recording function can be provided by commercially available systems such as systems from NICE® or WITNESS® which would provide an output to the analysis server two (2) at 256 making these data available for analysis in geographic area 104 by an analysis team 250. Various protocols can be used to provide these data such as voice over Internet protocol (VoIP). Servers, such as 240 and 258, and any other device used to store the storable representations can be any suitable device configured to store data; examples of which include, but are not limited to, magnetic and optical disk drives, solid state memory, tape drives, etc.

Analysis team 250 is comprised of a team of individuals who are fluent in the language that the agents and customers converse in. Each analyst has a workstation as indicated by workstation 252 up to a general number of analyst workstations 254 which receive data from analysis server 2 indicated at 256. An analyst's workstation is typically configured as a desktop computer, which has a data display device such as a monitor, flat panel display, etc. The workstation is typically configured with one or more data input devices such as a pointing device, a computer mouse, a touch pad, a keyboard, a voice activated interface including a microphone, local storage (which can also be used to store the storable representations of interactions), etc. The workstation need not be confined to a desktop computer configuration; a laptop computer, a handheld computer, and a wearable computer are all alternative configurations for the workstation. In one embodiment, there will be fewer analyst workstations than agent workstations since it is generally not required to analyze every call that the agent makes. However, it is possible to employ a number of analysts sufficient to analyze every interaction that is made by every agent with every customer. In one embodiment, acceptable results are achieved with two to three analysts monitoring 50 to 70 agents interacting with customers in the airline reservation industry.

In one embodiment, the analysts review and evaluate agent/customer interactions to ensure that the agents have met quality of service criteria established for a particular business. In one embodiment, the evaluation process includes the areas of core skills, soft skills, selling skills, and specific know how. The analysts check core skills by analyzing the agent's method and competence in; answering the phone and greeting the customer; getting the order in the system; answering basic questions; and comprehension of a request made via email. Some reporting metrics used for report generation include the average call handle time and spelling and grammar used accurately during the interaction with the customer. Soft skills are checked by analyzing whether the agent's greetings are scripted; determining how "canned" the email responses are; determining whether the agent can handle an irate customer under pressure; and analyzing the agent's knowledge of when to engage the agent's supervisor to resolve the call. Some reporting metrics used for report generation for soft skills include whether the customer's issue was resolved with the first call, this includes metrics related to specific know how (i.e., technical support/knowledge), and how many repeat emails were required to resolve the customer's issue. Analyzing selling skills involves ranking the agent's ability to; recommend additional products (cross-sell); sell more of the product under discussion by successfully understanding the tone and intonation of the customer during the interaction; and comprehension of the products and services. Some reporting metrics used in report generation for selling skills include measurements of the agent's up-sell and cross-sell performance. In some embodiments, reporting can include scoring compliance with regulations such as the Telephone Consumer Protection Act (TCPA) or other regulations.

For example, if the customer interaction consisted of an inbound sales call where a customer called to place an order for a product, such as a camera, some of the criteria the analyst will be looking for are whether the agent has opened the call properly, acted courteously, attempted to up-sell (i.e., sell a higher end camera), cross-sell and add-on-sell (i.e., selling film and a camera accessory bag with the original camera order) the customer, and checking to determine if the agent was knowledgeable enough to meet the demands of the sale in order to accomplish the up-sell or cross-sell (e.g., could the agent explain the features and benefits and answer technical questions related to the product). Other criteria are employed as are appropriate for a particular industry. For example, in one embodiment, analysts will grade the interactions according to established quality monitoring criteria for a particular industry sector or a particular business. In one embodiment, an agent's performance is sampled at least once a day by the analysts generating report data and agent feedback. Report data is stored in data base 114 for later use and a portion thereof is tailored for the business and the business's agents at 108. Feedback is provided to the business and the agents at 260.

Wages earned by workers in geographic area 104 are lower than wages earned by workers in geographic area 102; thereby, creating geographic wage attenuation between the respective geographic areas. High frequency analysis of the agents' quality of service, provided to customer contacts, can be achieved while simultaneously increasing the business's profits. In one or more embodiments, a debit or a credit will be transferred in exchange for services provided by the analysts. An example of a debit is an invoice or a bill to show what is owed and an example of a credit is payment in the form of valuable consideration.

FIG. 2B and FIG. 2C display an embodiment of a score sheet that can be used by an analyst to evaluate and score a transaction between an agent and a customer. With reference to FIG. 2B, a score sheet is shown generally at 260a and continues onto FIG. 2C at 260b. Score sheet 260a can be provided in many different ways, the embodiment depicted within the figures is but one of the many different formats that can be used to evaluate an agent/customer transaction. Score sheet 260a/260b can be configured as a software application that is displayed on the analyst's workstation, such as workstation 252 in FIG. 2A. Alternatively, score sheet 260a/260b could be displayed on any data display configured to interact with the flow of data emanating from geographic area 102 (FIG. 2A), which is accessible to analysts in geographic area 104 (FIG. 2A).

An analyst evaluates a transaction between an agent and a customer by replaying or reviewing a stored representation of the transaction and then assigning a score to the components of the agent/customer interaction based upon an evaluation of the transaction. In one embodiment, the evaluation proceeds with the analyst replaying a stored representation of a telephone call. In another embodiment, the evaluation proceeds when the analyst reviews an email exchange between an agent and a customer. In other embodiments, the interaction can consist of a combination telephone call and email exchange between the agent and the customer or the interaction can be embodied in other formats. In the example shown in FIG. 2B and FIG. 2C, an evaluation consists of scoring a telephone interaction between an agent and a customer. The interaction can be broken down into the major categories of "Call Opening" 264, "Customer Service Skills" 272, "Call Closing" 280, "Knowledge, Accuracy and Resolution" 282, "Call management" 284, "Sales" 286, "Comments Summary" 288, and "Even better tips" 290.

In the embodiment shown, "Call Opening" 264 has subcategories that are scored individually by the analyst. For example, the degree to which the agent used the proper greeting is assigned a score by the analysts at location 266. The score can be assigned using any suitable grading scale such as a numeric scale, an alphabetical scale or other scale created to rank the agent's performance. In one embodiment, a numeric scale can be used having a range of values from 1 to 10, where 1 indicates minimum compliance and 10 indicates maximum compliance. Other ranges can be used, such as 1 to 5; no limitation is implied by the ranges given in this description.

Another subcategory, "Asked for Transaction ID," is assigned a score after evaluation in location 268. The scoring for item 268 can be according to a two state yes/no score rather than a score that comprises more than two states. The other subcategories are scored and the analyst can enter comments pertinent to the category or subcategory in field 270.

The other major categories 272, 280, 282, 284, and 286 are scored in a similar way, whereby the analyst assigns scores to the subcategories and comments as needed. A total score (not shown), representing the evaluation of the interaction, can be assigned either automatically by a scoring algorithm, as part of a computer based application, or by the analyst.

With reference to FIG. 2C, fields for "Comments Summary" 288 and "Even better tips" 290 are provided. The analyst can provide a comment summary in field 288, if it is deemed necessary, after completing the evaluation. Additionally, the analyst can provide "Even better tips" in field 290. In one embodiment, "Even better tips" can include one or more elements of an interaction that the agent performed well and one or more elements of the interaction that the agent could perform even better, with a suggestion from the analyst explaining how the agent might achieve the increased performance. In another embodiment, the "Comments Summary" 288 can include one or more elements that the agent performed well and the "Even better tips" 290 can include one or more elements that the agent could perform even better.

In one embodiment, the score sheet can serve as a training aid to the analyst by apprising the analyst of new information pertinent to the business's activity or reminding the analyst of information that is of particular importance. For example, in FIG. 2B, field 262 can be implemented as a scrolling update bar in a window on a data display for the benefit of the analyst; thereby, displaying information as shown in the figure. Training the analysts will be described more completely below in conjunction with FIG. 3B.

Figure 3A:
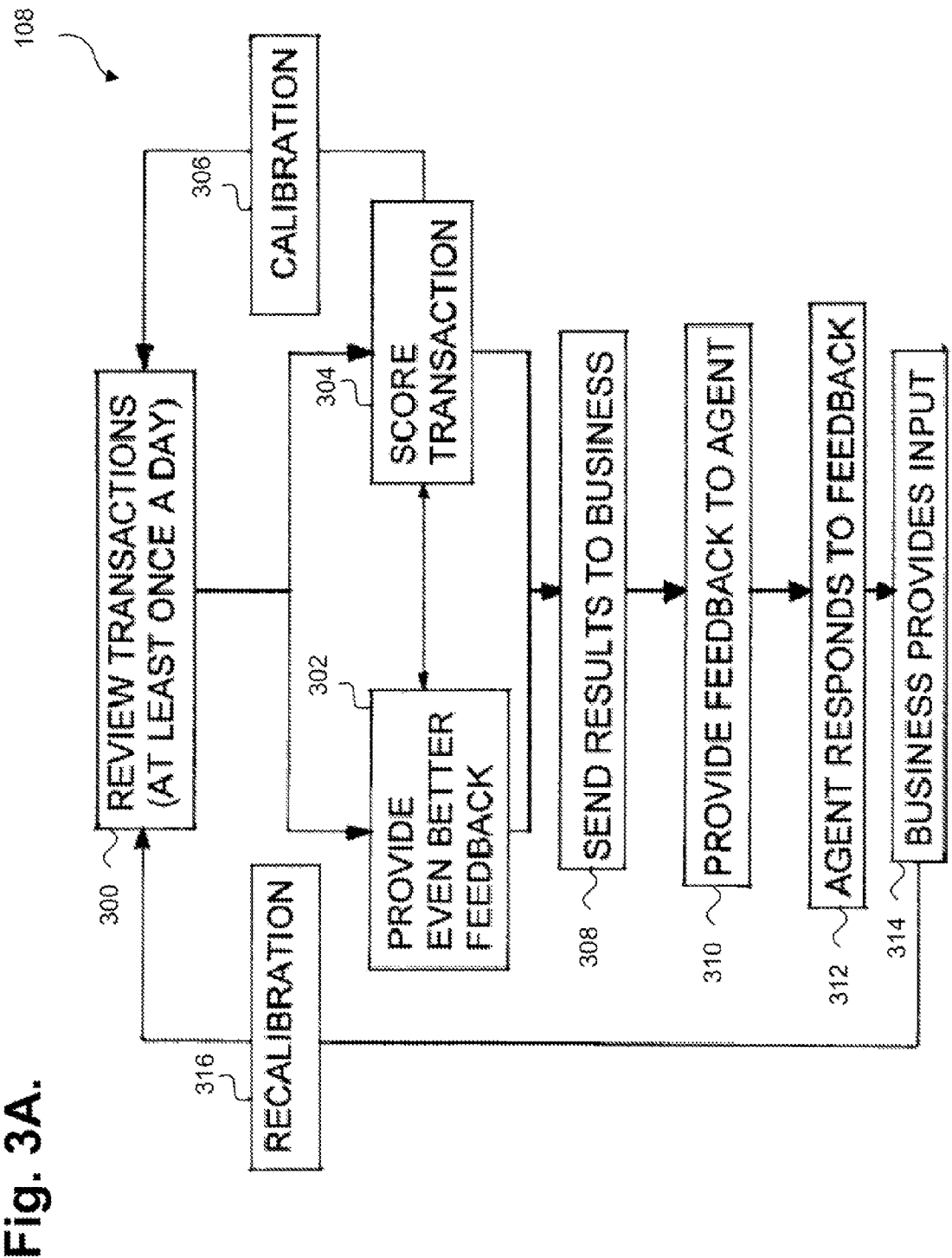
FIG. 3A illustrates a flow diagram for interaction analysis and feedback according to one embodiment of the invention.

FIG. 3A illustrates a flow diagram for interaction analysis and feedback according to one embodiment, generally shown at 108. With reference to FIG. 3A, analysts review and evaluate transactions between agents and customers at 300. Such evaluations can be performed according to the description associated with FIG. 2B and FIG. 2C. Initially, a calibration loop 302-304-306 provides uniformity in scoring an agent's performance by submitting the same agent's data to the entire team of analysts multiple times and reviewing the scored results between the analysts until the variation between analysts' scores of the same agent's data is within acceptable limits (internal calibration). The same calibration process follows between the team of analysts and the agent's specific team supervisor and/or manager. The agent, the agent's team supervisor or the agent's manager can be referred to as the client, in such a case, calibrating the analysts to one or more of these entities associated with the particular business can be referred to as a "client calibration." Acceptable calibration limits will be determined by the requirements of particular businesses; however, in one embodiment, a deviation of five percent (5%) between individual analyst's agent-scores (internal calibration) is one example of an acceptable level of uniformity and a deviation of five percent (5%) during a client calibration is one example of an acceptable level of uniformity.

Calibration of the interaction evaluation process can also be performed by using Anonymous Transaction Simulations (ATS). During an ATS calibration, a common transaction is delivered to all or a specific group of analysts to score. The scoring can also include the analysts adding their particular even better tips. During the ATS calibration, the analysts are unaware that the transaction is a common replicate. The common transaction need not be an actual transaction, but it can be a transaction designed to test a particular category or subcategory of a transaction. The agent's manager, supervisor or the analyst's supervisor or subject matter expert (described in conjunction with FIG. 3B) can use the ATS to test specific training updates, issues or unique customer interaction scenarios.

Further calibration can be provided by the analyst's supervisor or subject matter expert in the form of a random quality audit. In one embodiment, during a random quality audit, the analyst's evaluation (s) of one or more agent/customer interactions are evaluated by the analyst's supervisor, subject matter expert, or equivalent manager.

As previously described in conjunction with FIG. 2A, agent teams (sometimes referred to as customer contact centers or call centers) can be located in different geographic areas or at different locations within a single geographic area. Therefore, a business can have a plurality of customer contact centers across which the previously described calibration processes can be performed. One or more of these customer contact centers can be located internal to the business and one or more of these customer contact centers can be located external to the business. The calibration processes described herein are equally applicable to a mixture of internal and external customer contact centers. An example of an internal customer contact center is, but is not limited to, a center operated under the control of the business. An example of an external customer contact center is, but is not limited to, a customer contact center that is operated under limited control or influence by the business, such as by contractors or a contractor provided service via an external customer contact center.

The transaction score 304 and even better feedback 302 are sent to the business at 308. Feedback is provided to the respective agents at 310. Agents can respond to the feedback at 312 and the business provides input at 314. Depending on the agent's response and the input from the business, recalibration of the analysts may be required at 316. The process described in FIG. 3A is flexible and accommodates agents' responses and the contact center management's response by customizing scoring as needed. In one embodiment, the even better feedback 302 includes informing an agent of an agent performance element that was well performed, and informing the agent of a performance element that could be performed even better than the way the agent presently performs the element. Additionally, the even better feedback 302 can include training tips, provided as appropriate to contact center management or the agent based on analyzing the agent's interaction with customers.

Figure 3B:
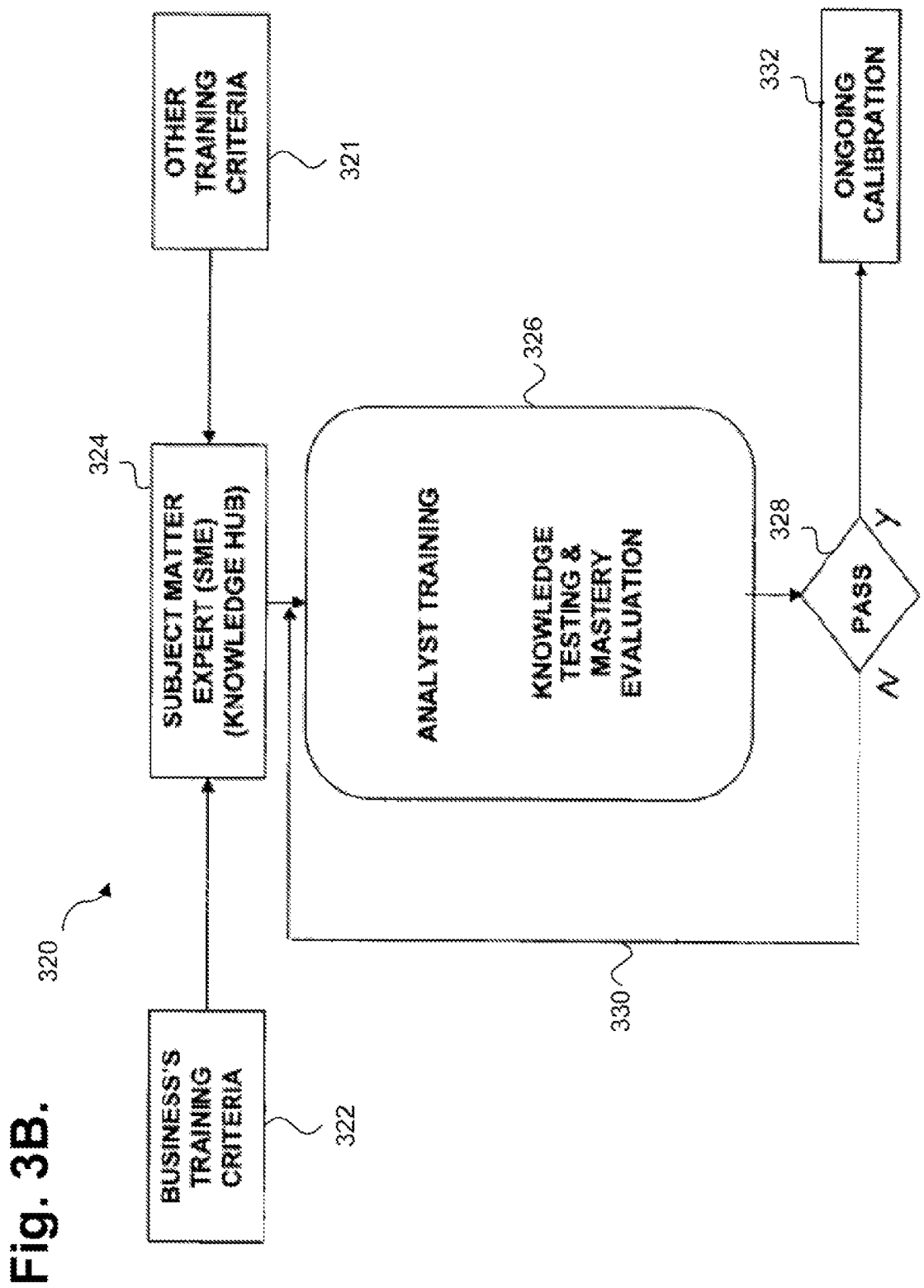
FIG. 3B is a training flow chart according to one embodiment of the invention.

In various embodiments, the invention can be applied to suit the needs of any business. Specific knowledge about the procedures, processes, products, and/or services of any business can be assimilated by the analysts during training; thereby, allowing the analysts to become an extension of the business's customer contact center. FIG. 3B displays a training flow chart at 320, according to one embodiment of the invention. With reference to FIG. 3B, "Business's training criteria" 322 includes information relevant to the business that needs to be considered in the context of evaluating an agent/customer interaction. Information 322 flows as needed to a subject matter expert 324. The subject matter expert 324 ensures that the pertinent information, 322, is disseminated to and assimilated by the analysts as needed. As indicated previously in conjunction with FIG. 2B at 262, the subject matter expert can provide training updates to the analysts. The subject matter expert effectively functions as a knowledge hub, maintaining a knowledge base and communicating this knowledge, comprising product, service, process, updates, etc. to the analysts.

In one or more embodiments, analysts receive training in block 326; the training is based on the requirements that are compiled by the subject matter expert in 324. In one embodiment, an analyst's training includes reading an update when the analyst logs onto a workstation, such as 252 in FIG. 2A, before the analyst can proceed to evaluate agent/customer interactions. The analyst can be required to check a confirmation box before being allowed to proceed to evaluations.

The analysts' knowledge can be improved by the subject matter expert, such improvement directly enhances client calibration results; thereby minimizing discrepancies between an analyst's score and the score that an agent's manager would give for the same interaction. Internal calibration is also improved by increasing the analyst's knowledge of information 322 and other training criteria 321 as is appropriate. The subject matter expert can improve the analysts' knowledge by creating knowledge testing programs. In one embodiment, test questions are compiled by the subject matter expert and passing criteria are set at 328. If an analyst meets the passing criteria by achieving a passing grade on the knowledge test then that analyst can proceed to perform evaluations of interactions. Those interactions will continue to be the subject of ongoing calibration as indicated at 332. Ongoing calibration will be described more fully in conjunction with FIG. 3C. If the analyst does not meet the passing criteria at 328 then further training is indicated by path 330.

At times it may be desirable to communicate urgent updates to the analysts in the form of a verbal communication from the subject matter expert, some other person or an automated system. In such a case, a transaction hold can be administered, which would prevent the analysts from evaluating transactions until the analysts are addressed and the hold is removed.

In some embodiments, the training described herein with respect to the analysts can be directed to the business's agents. This training can be administered in the form of training updates, quizzes, or online exercises. Agent training can be adapted to the specific needs of a particular business.

In other embodiments, other training criteria 321, such as knowledge amassed from services provided to a first business can be directed toward improving the performance of a second business. Other training criteria 321 can include data accumulated from the high frequency evaluations of the agent/customer interactions as well as the training criteria and knowledge assembled by the subject matter expert or other personnel or automated system.

Various types of calibration were described in conjunction with FIG. 3A, these individual types of calibration can be combined and applied to both minimize the length of time needed to train and deploy a team of analysts to commence evaluation of a business's customer transactions, and to minimize the length of time required for a business's agent team to gain operational competency with respect to the subject matter of the business.

Seasonal or limited duration agents, such as non-full time employees or contractors, present training problems for many businesses since these agents are typically hired for a short period of time and the agents must be trained in an even shorter period of time. For a business to enjoy a productive period of working time from these agents, the agents must be trained in a time period that is shorter than the duration of the season or time period for which they were hired to work in. Therefore, it is desirable to shorten the training period of the agents as much as possible.

In one embodiment, of the invention, a calibration process for a business's agents is described with the aid of FIG. 3C. In this embodiment, the agents can be short duration or seasonal employees or contractors. No limitation is implied by the type of work relationship that exists between the person (agent) and the business, e.g., agent, employee, or contractor. With reference to FIG. 3C, a table 338 displays a calibration timeline, where time proceeds down the rows of the table 338, e.g., 342, 344, 346, and 348. The types of calibration are displayed as columns in table 338, e.g., 352, 354, 356, and 358.

In this embodiment, the analysts are trained for two (2) weeks as described in conjunction with FIG. 3B; thereby, allowing the analysts to assimilate the pertinent information from sources 322 and/or 321 (FIG. 3A). This two week training period is indicated at row 340, column 350 in FIG. 3C. Week one consists of a nesting period, row 342, where one hour of client calibration 352 and one hour of internal calibration 354 is undertaken daily to ensure that the analysts produce evaluations that are consistent with evaluations that the client would produce and that the analysts' evaluations are internally consistent. Also within the first week, Anonymous Transactions Simulation (ATS) are administered at the rate of one (1) transaction per agent per day at 356. The analysts' evaluations are audited within column 358 for quality at the rate of twenty (20) percent of the total evaluations performed to ensure rapid convergence of the analysts' evaluations and to spot problems that might need to be addressed early in the calibration process.

During week two (2), indicated by row 344, the client calibration 352 is reduced to three (3) hours a week and the internal calibration 354 is reduced to three (3) hours a week. During this second week, the ATS rate 356 can be decreased to two (2) transactions per agent per week and the quality audit 358 can be decreased to ten (10) percent of total transactions evaluated.

During week three (3), indicated by row 346, the client calibration 352 is reduced to two (2) hours a week and the internal calibration 354 is reduced to two (2) hours a week. During this second week, the ATS rate 356 can be decreased to one (1) transaction per agent per week and the quality audit 358 can be decreased to five (5) percent of total transactions evaluated. Presumably, the seasonal employees of the business (agents) are learning the material required for their seasonal job with the passage of time and the frequency of the types of calibration administered can be reduced as the passage of the successive weeks indicates.

In the fourth and subsequent weeks, indicated by row 348, ongoing calibration will consist of two hours of client calibration 352 a week, two (2) hours of internal calibration 354 a week; one (1) ATS transaction per agent per week 356; and a five (5) percent quality audit 358 of transactions evaluated.

In the previous description, durations of the various types of calibration were given as examples; no limitation is implied by these durations such as numbers of weeks, hours, percentages, etc. These quantities are illustrative of one embodiment. Other time periods and frequencies are possible and appropriate to meet the particular needs of specific businesses and business objectives.

In one or more embodiments of the invention, communication between agents, analysts, support personnel (subject matter experts), etc., and the respective managers is accomplished with the aid of the networks described in conjunction with the previous figures. Components of an integrated software application that incorporates the previously described functionality is illustrated in FIG. 3D, according to one embodiment of the invention.

Figure 3D:
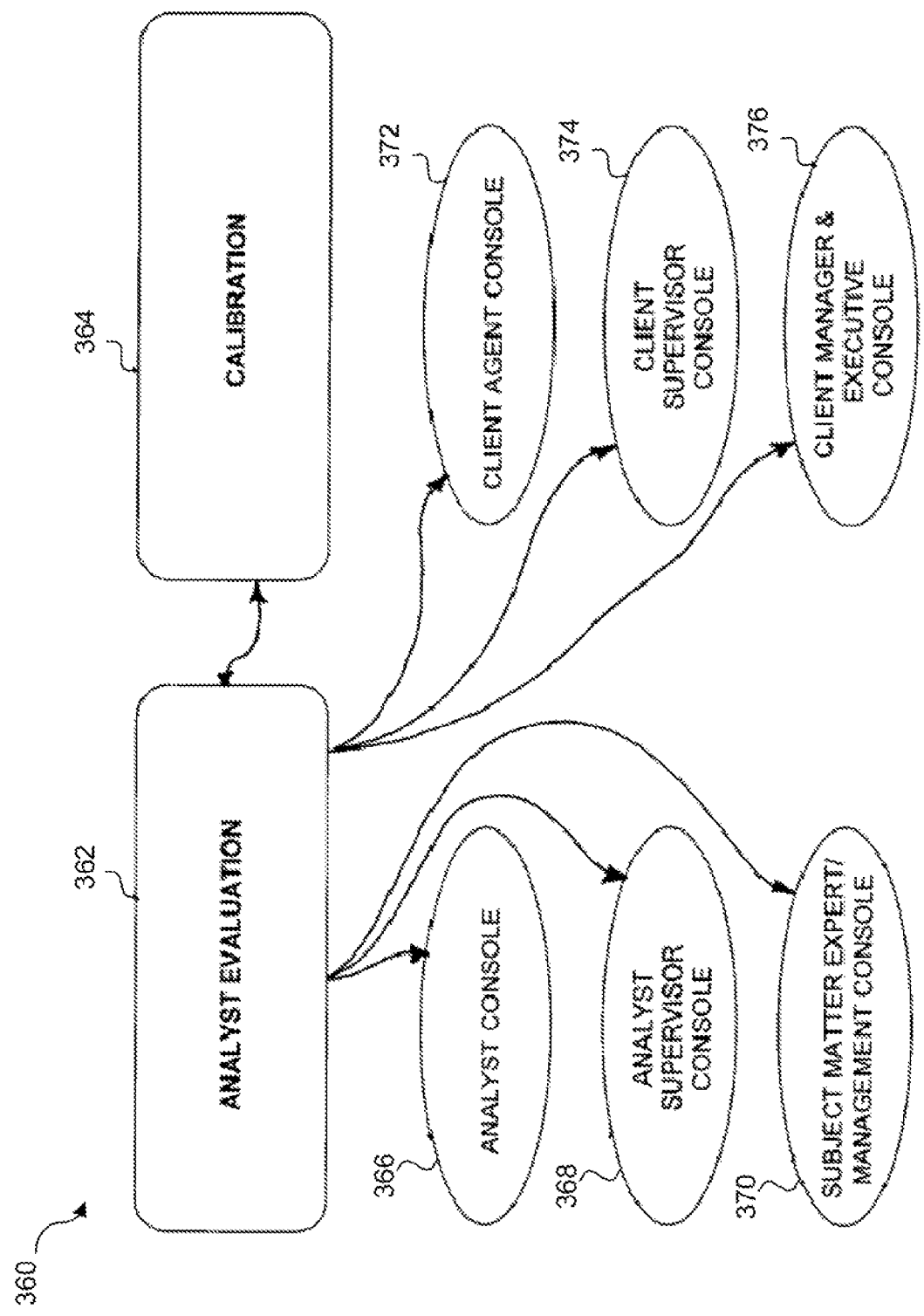
FIG. 3D is one embodiment of an Internet based agent level evaluation feedback tool.

FIG. 3D is one embodiment of an Internet based agent level evaluation feedback tool, shown generally at 360. With reference to FIG. 3D, analyst evaluations are indicated within block 362. The analysts receive transactions and the appropriate evaluation criteria based on a particular business and the pertinent product/service knowledge. The evaluations of the agent/customer interactions involve monitoring the transactions at an agent level, scoring evaluations, reporting on trends and opportunity areas for the business, providing even better tips, compliance monitoring, and other feedback as needed by the particular business, as well as making this information available to the business.

As previously described, these evaluations 362 are the subject of different types of calibration; internal calibration, client calibration, Anonymous Transaction Simulations (ATS), and quality audits, all indicated generally at 364. These calibrations raise the performance level of the analysts and the business's agents as previously described.

In one embodiment, an Analyst's Console 366 provides the analyst with project updates, is used during calibration, displays quality and productivity scores, can be used for knowledge testing and other communications from, for example, the subject matter expert or others as previously described.

In one embodiment, the Supervisor's Console 368 provides the analysts' supervisor with data on one or more of the particular campaigns that can be in progress for one or more businesses, which are being supported by the analysts as described herein. Supervisor's Console 368 can provide information to the supervisor, such as but not limited to; real-time campaign results, project updates, agent team and/or agent level reporting, subject matter expert (SME) feedback, transaction evaluations, etc.

In one embodiment, a SME/Management Console 370 can be used to provide a reporting suite for analysis, track training updates, provide training suggestions, maintain a knowledge base, etc.

In one embodiment, information is divided between the analyst side, as described above, and the client (business) side. The client side can include a Client Agent Console 372, which can provide feedback to the agents on items such as the agent's customer interactions that were evaluated and the associated scores, comments, even better feedback tips, etc. Client Agent Console 372 can also include agent improvement results or lack of improvement, previous transactions identified for agent self-awareness, etc. Client Agent Console 372 can also provide the agent with training updates, quizzes, and on-line exercises as needed to suit a particular business's need.

In one embodiment, a Client Supervisor Console 374 can provide data such as, agent level scores, top defects in agent performance, stack ranking of agents' performance, agent team reports, trend analysis, individual and agent team based improvements, training suggestions, and improvement margins.

In one embodiment, a Client Manager & Executive Console 376 can include agent and agent team trends, stack ranking, top defects, training and process improvement suggestions, agent team performance improvement margins, etc.

In general, the consoles described in relation to FIG. 3D can be tailored to the needs of any business that requires customer interactions. The description of information available on the various consoles of FIG. 3D is illustrative of one or more embodiments of the invention and is not to be taken in a limiting sense. Various other compilations of information and functionality will be apparent to those of skill in the art from the teachings presented herein.

Figure 4:
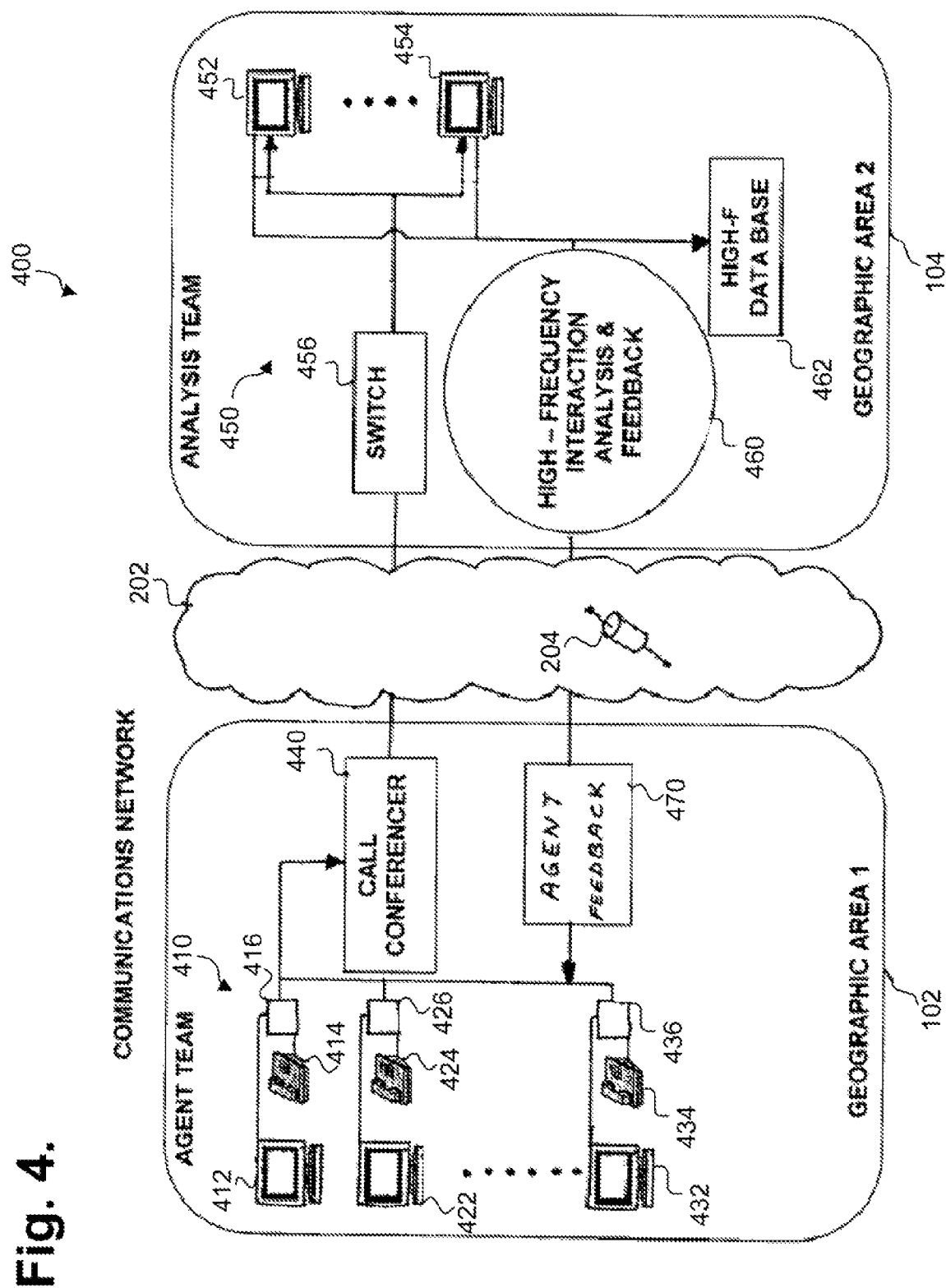
FIG. 4 illustrates real-time high frequency contact center monitoring according to one embodiment of the invention.

FIG. 4 illustrates real-time high frequency contact center monitoring according to one embodiment of the invention, generally shown at 400. A business's customer contact center is indicated by agent team 410 within geographic area 102. Not all of the business's customers need to be located within geographic area 102. The customers can be located in any geographic area and need not be limited to the two geographic areas shown, 102 and 104. Agent team 410 can contain a general number of agents as indicated in FIG. 4 within geographic area 102. The agent team need not all be located within the same geographic area. For simplicity, only two geographic areas have been presented herein, 102 and 104. Other communications networks (not shown) provide communications between customers in other geographic areas and the agent team 210 as well as providing communications between agent teams located in different geographic areas or an agent team distributed between different geographic areas.

A first agent's workstation consists of computer 412 and telephone 414. Calls and corresponding customer account information, for example, are combined at 416 and are available to conference via 440 to the analysis team 450 in the second geographic area 104. Similarly, a second agent's computer indicated at 422 and telephone 424 are combined at 426 and routed to call conferencer 440. A general maximum number of workstations is indicated by computer 432. Computer 432 and telephone 434 are combined at 436 and routed to 440.

Communications network 202 couples geographic area 102 with geographic area 104 allowing information to flow between the respective areas. Communications network 202 can include one or more satellites as indicated by 204. Communications network 202 facilitates the flow of agent/customer calls from call conferencer 440 in geographic area 102 to switch 456 in geographic area 104. Call conferencer 440 can include a device such as an automatic call distributor (ACD).

Analysis team 450 is comprised of analysts and analyst workstations 452 up to a general number indicated by 454. Agent/customer calls are distributed to analysts through switch 456 providing real-time monitoring by the analysts. Near real-time high frequency interaction analysis 460 provides the agent with nearly immediate feedback 470 on his or her performance during the customer contact. Such feedback to an agent enhances learning and decreases learning curve time, generally apparent with new agents. Ongoing analyses of agent/customer interactions are compiled in the high frequency data base 462.

Wages earned by workers in geographic area 104 are lower than wages earned by workers in geographic area 102; thereby, creating geographic wage attenuation between the respective geographic areas. High frequency analysis of the agents' quality of service, provided to customer contacts, can be achieved while simultaneously increasing the business's profits. In one or more embodiments, a debit or a credit will be transferred in exchange for analysis services provided by the analysts. An example of a debit is an invoice or a bill to show what is owed and an example of a credit is payment in the form of valuable consideration.

Within the figures presented in this detailed description of embodiments, separate paths have been used to depict the flow of customer interaction data and feedback from the analysis of these data for simplicity, no limitation is implied by this depiction. It will be realized by those of ordinary skill in the art that communication systems can support bidirectional communication over a single transmission line. Such bidirectional systems could be represented by a single line or path between points in a communications link, no limitation is implied thereby.

Figure 5:
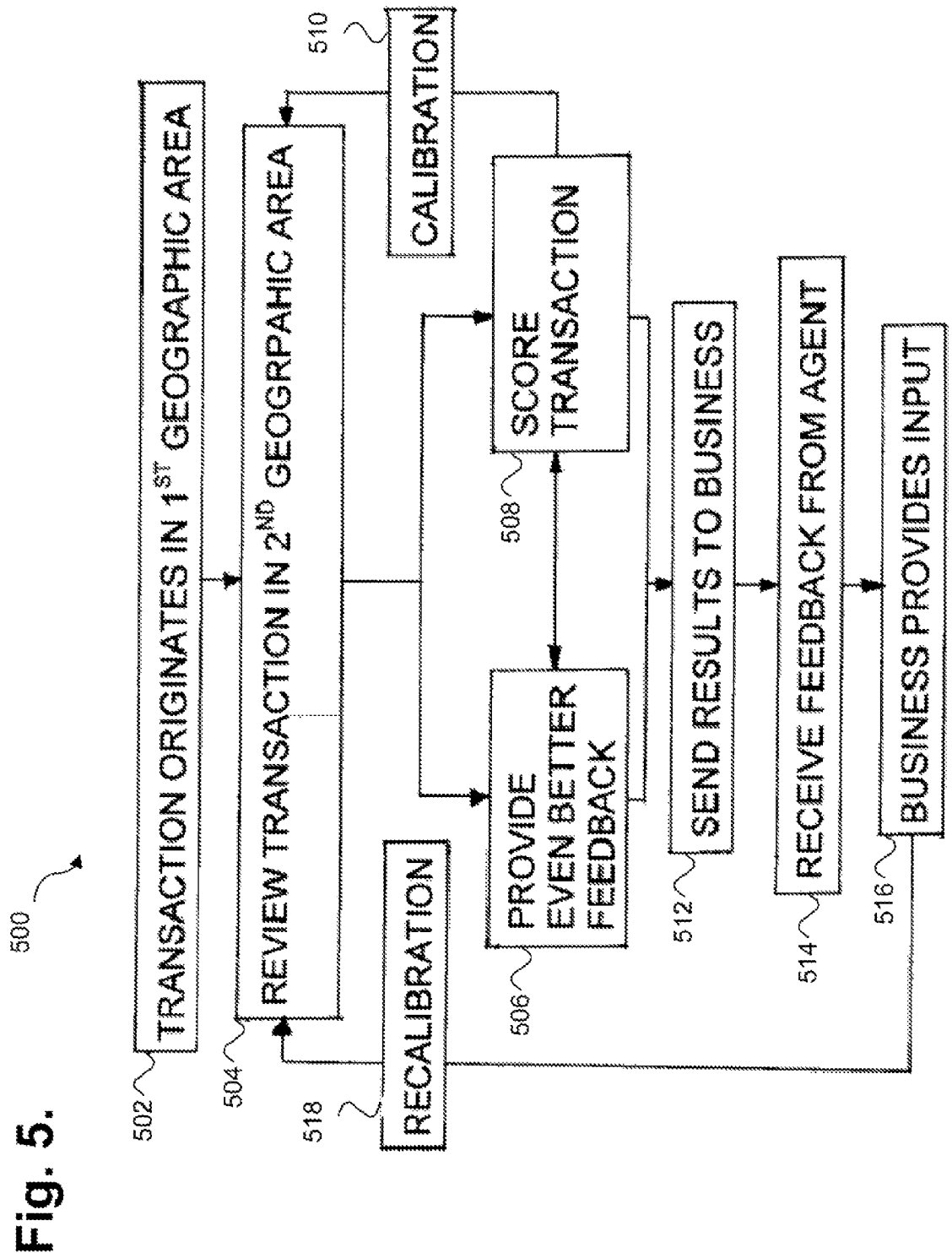
FIG. 5 illustrates a flow diagram for interaction analysis corresponding to FIG. 4.

In one embodiment, FIG. 5 illustrates a flow diagram for interaction analysis corresponding to FIG. 4 and generally depicts the process at 500. With reference to FIG. 5, in one embodiment, transactions originate in the first geographic area 502; customers and agents can be located in geographic areas other than 102, as described in conjunction with the previous figures. Analysts in the second geographic area 504 evaluate the transactions in near real-time to provide concurrent feedback to the agent. Calibration of the evaluation process is indicated by a calibration loop 506-508-510 to provide uniformity in scoring an agent's performance by conferencing the same agent's call to the team of analysts and reviewing the analysts' responses with the analysts (facilitated by an analyst supervisor or other facilitator) until the variation between the analysts' responses to the same agent's data is within acceptable limits. Acceptable calibration limits will be determined by the requirements of particular businesses; however, in one embodiment, a deviation of three percent (3%) between individual analyst's agent-scores is one example of an acceptable level of quality.

Even better feedback at 506, along with the transaction, scored at 508, is provided to the agent in near real-time. Information from the analysts can be displayed directly on an agent's computer monitor such as computer 412, 422 or 432. In one embodiment, near real-time results are sent to the business's contact center management at 512 as well as other levels of the business organization as are appropriate. Feedback is received from the agent at 514, input on the analysts' reports and even better performance suggestions are analyzed by the business and input is fed back to a recalibration process 518 that ensures that the scoring 506 and 508 are in accordance with the goals of the particular business. Following this process, embodiments can be adapted and scaled to the needs and size of particular businesses.

Figure 6:
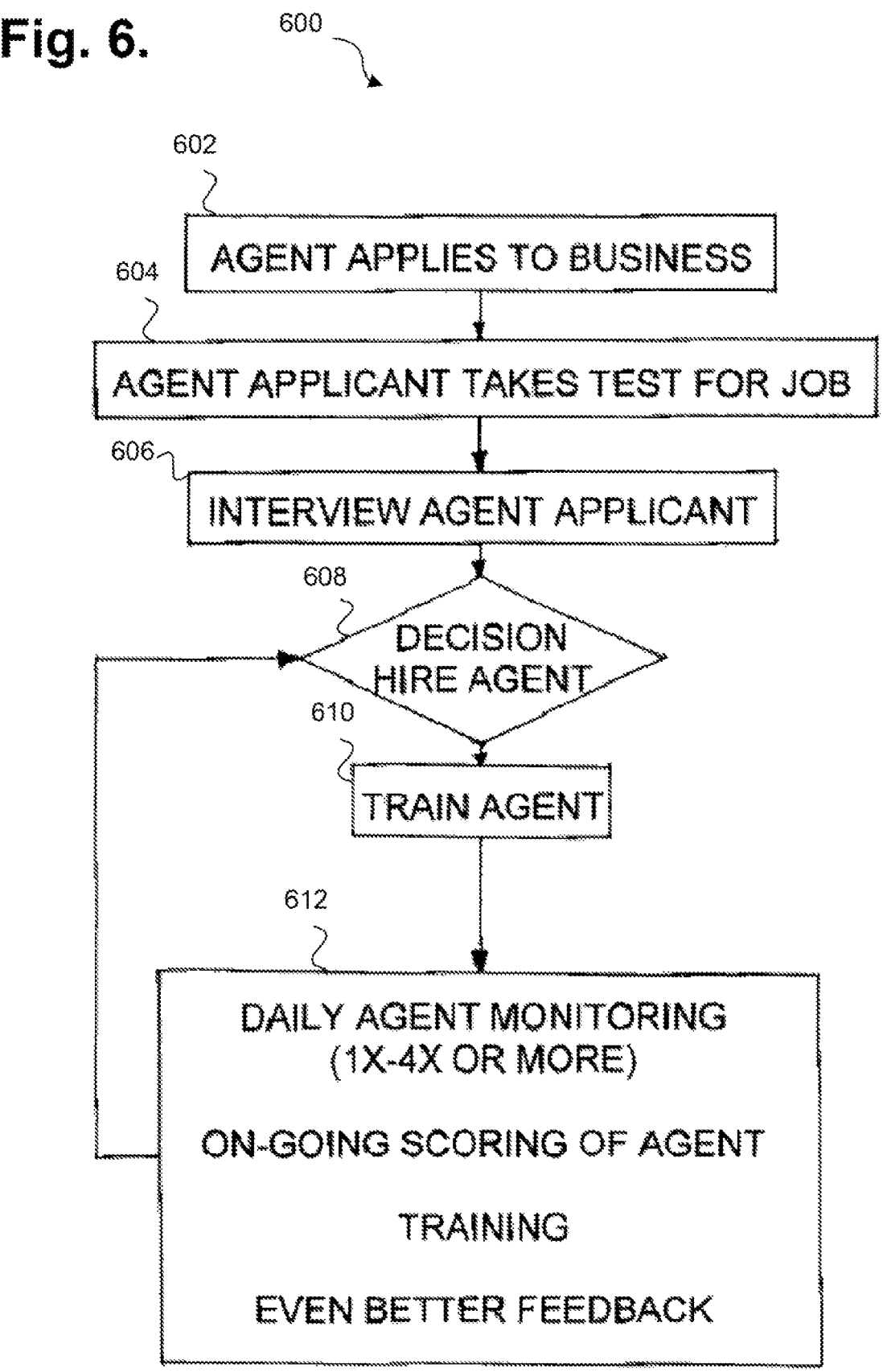
FIG. 6 illustrates a flow diagram employing a high frequency data base, according to one embodiment of the invention.

In one or more embodiments, FIG. 6 illustrates a flow diagram employing a high frequency data base, generally shown at 600. With reference to FIG. 6, the high frequency data base representing the accumulation of data on agents' performance during contact center interactions is collected on a substantially continuing basis and is used by a business to guide the business's future decisions with respect to hiring an agent for a particular job. At 602, an agent applies for a job with a particular business. The agent applicant takes a test at 604 to determine the prospective agent's suitability for the particular job. The agent is interviewed for the particular job at 606 and a decision to hire the agent is made at 608 based in part on the agent's application, interview, and the high frequency data base. The high frequency data base can be used to filter the application and interview elements based on agent characteristics that have been found to correlate with successful agent performance. For example, in one embodiment, it has been discovered that an agent's ability and propensity to up-sell during a sales call is increased if the agent personally participates in and uses the product that the customer is asking about. Therefore, in certain fields, the business will prefer to hire applicant's who have personal experience using products that the business is selling.

Following hiring, training occurs at 610. Training times are also recorded in the high frequency data base and are also used to guide future hiring decisions. Process 612 can include an accelerated 4X monitoring phase that in one or more embodiments is useful to train agents in certain industries. For example, when a new seasonal line of clothing is introduced, it is advantageous to enhance the feedback that agents receive by monitoring the agents' performance six times a day (6×). In another embodiment, when a new promotional program is introduced, such as a new cruise line vacation package, 4X training provides for a shorter learning curve for the agent which results in revenue improvement for the business.

FIG. 7 illustrates an example of increased profitability according to one embodiment of the invention. With reference to FIG. 7, a single agent's contribution to increasing the profitability of a business is shown generally at 700. Single agent activity is shown in column 702. Existing agent performance without the improvements taught herein is shown in column 704. The enhanced agent performance provided by the teachings according to one embodiment of the invention provides an increase in the agent's up-sell rate from 8.0% (704) to 8.8% (706). This up-sell rate increase is applied to 4.96 up-sell transactions a day (704) increasing the number of up-sell transactions to 5.46 (706). Up-sell revenue is increased from $124.00 (704) to $150.04 (706). Subtracting these two numbers provides a revenue improvement of $26.04 as indicated at 710. A profit margin of 50% on the revenue improvement of $26.04 produces an increased profit of $13.02 as indicated at 712. The average daily cost to the business for the analyst is $1.50 with a geographic wage attenuation of 0.2, resulting in a daily return on investment (ROI) of 768% as indicated at 716.

It will be appreciated that the methods described in conjunction with the figures may be embodied in machine-executable instructions, e.g. software. Alternatively, some of the methods can involve the participation of an operator with a general-purpose processor that is programmed with the instruction to perform the operation described. The instructions can be used to cause a general-purpose or special-purpose processor that is programmed with the instructions to perform the operations described. Alternatively, the operations might be performed by specific hardware components that contain hardwired logic for performing the operations, or by any combination of programmed computer components and custom hardware components. The methods may be provided as a computer program product that may include a machine-readable medium having stored thereon instructions which may be used to program a computer (or other electronic devices) to perform the methods. For the purposes of this specification, the terms "machine-readable medium" shall be taken to include any medium that is capable of storing or encoding a sequence of instructions for execution by the machine and that cause the machine to perform any one of the methodologies of the present invention. The term "machine-readable medium" shall, accordingly, be taken to include, but not be limited to, solid-state memories, optical and magnetic disks, and carrier wave signals. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result.

As used in this description, "one embodiment," "one or more embodiments," "an embodiment" or similar phrases means that feature(s) being described are included in at least one embodiment of the invention. References to "one embodiment" or any reference to an embodiment in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein. Also, as used in this description, the terms "interaction" and "transaction" are synonymous.

While the invention has been particularly shown and described as referenced to the embodiments thereof, those skilled in the art will understand that the foregoing and other changes in form and detail may be made therein without departing from the spirit and scope of the invention.

What is claimed is:

1. A system for analyzing agent interactions, comprising:
   a calibration module to provide to analysts, a common interaction between a customer and an agent of a business;
   a score module to receive performance scores for the common interaction from each of the analysts, to compare the performance scores, and to unify scoring by the analysts, comprising:
      a deviation module to determine a deviation between the performance scores and to compare the deviation to a threshold;
      an interaction distribution module to provide further common interactions to one or more of the analysts when the deviation falls below the threshold;
      a further score module to receive from the one or more analysts, other performance scores for at least one of the further common interactions;
      a further deviation module to determine a further deviation between the other performance scores and to compare the further deviation to the threshold; and
      an identification module to identify the one or more analysts as unified analysts when the further deviation exceeds the threshold;
   an update module to communicate an update to the unified analysts during the scoring by placing a hold to prevent the unified analysts from evaluating one of the further common interactions, providing the update to the unified analysts, and subsequently, removing the hold;
   a further interaction distribution module to provide one or more interactions to at least one of the unified analysts;
   a feedback module to receive from each of the unified analysts, a further performance score for the interaction and to provide to the business, the further performance scores for the agent associated with the one or more interactions; and
   a processor to execute the modules.

2. A system according to claim 1, wherein the feedback module provides, with each of the performance score, other performance scores, and further performance score, feedback comprising training tips, a performance element that could be improved, and a performance element that was well performed.

3. A system according to claim 1, wherein the one or more interactions are obtained at a rate comprising at least one of one or more interactions per agent per day and one or more interactions per agent per week.

4. A system according to claim 1, wherein the agents are located in one geographic location and the analysts are located in a different geographic location.

5. A system according to claim 4, wherein the second geographic location comprises wages lower than the wages in the first geographic area.

6. A system according to claim 1, wherein the common interactions, the further common interactions, and one or more interactions each comprise at least one of telephone calls and emails.

7. A system according to claim 1, wherein the each comprise one of a recording and a real time interaction.

8. A system according to claim 1, wherein the performance scores, other performance scores, and the further performance score are each based on factors comprising at least one of each agent's selling skills, knowledge, ability to provide a greeting, resolve a call, and take an order.

9. A system according to claim 1, further comprising:
a score distribution module to provide the further performance score to at least one of the analyst's supervisor, subject matter expert, and manager.

10. A system according to claim 1, wherein the deviation threshold comprises five percent.

11. A method for analyzing agent interactions, wherein all steps are performed by a computer, comprising:
providing to analysts, a common interaction between a customer and an agent of a business;
receiving performance scores for the common interaction from each of the analysts and comparing the performance scores;
unifying scoring by the analysts, comprising:
   determining a deviation between the performance scores and comparing the deviation to a threshold;
   providing further common interactions to one or more of the analysts when the deviation falls below the threshold;
   receiving from the one or more analysts, other performance scores for at least one of the further common interactions and determining a further deviation between the other performance scores;
   comparing the further deviation to the threshold; and
   identifying the one or more analysts as unified analysts when the further deviation exceeds the threshold;
communicating an update to the unified analysts during the scoring, comprising:
   placing a hold to prevent the unified analysts from evaluating one of the further common interactions; and
   providing the update to the unified analysts and subsequently, removing the hold;
providing one or more interactions to at least one of the unified analysts; and
receiving from each of the unified analysts, a further performance score for the interaction and providing to the business, the further performance scores for the agent associated with the one or more interactions.

12. A method according to claim 11, further comprising:
providing with each of the performance score, other performance scores, and further performance score, feedback comprising training tips, a performance element that could be improved, and a performance element that was well performed.

13. A method according to claim 11, wherein the one or more interactions are obtained at a rate comprising at least one of one or more interactions per agent per day and one or more interactions per agent per week.

14. A method according to claim 11, wherein the agents are located in one geographic location and the analysts are located in a different geographic location.

15. A method according to claim 14, wherein the second geographic location comprises wages lower than the wages in the first geographic area.

16. A method according to claim 11, wherein the common interactions, the further common interactions, and one or more interactions each comprise at least one of telephone calls and emails.

17. A method according to claim 11, wherein the common interactions, further common interactions and one or more interactions each comprise one of a recording and a real time interaction.

18. A method according to claim 11, wherein the performance scores, other performance scores, and the further performance score are each based on factors comprising at least one of each agent's selling skills, knowledge, ability to provide a greeting, resolve a call, and take an order.

19. A method according to claim 11, further comprising:
providing the further performance score to at least one of the analyst's supervisor, subject matter expert, and manager.

20. A method according to claim 11, wherein the deviation threshold comprises five percent.

* * * * *